US010871296B2

(12) United States Patent
Sakai et al.

(10) Patent No.: US 10,871,296 B2
(45) Date of Patent: Dec. 22, 2020

(54) HUMIDIFIER AND AIR-CONDITIONING APPARATUS INCLUDING HUMIDIFIER

(71) Applicant: MITSUBISHI ELECTRIC CORPORATION, Chiyoda-ku (JP)

(72) Inventors: Takahiro Sakai, Chiyoda-ku (JP); Akira Morikawa, Chiyoda-ku (JP); Yasutaka Inanaga, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1042 days.

(21) Appl. No.: 14/897,767

(22) PCT Filed: Jun. 19, 2014

(86) PCT No.: PCT/JP2014/066357
§ 371 (c)(1),
(2) Date: Dec. 11, 2015

(87) PCT Pub. No.: WO2015/040910
PCT Pub. Date: Mar. 26, 2015

(65) Prior Publication Data
US 2016/0146483 A1 May 26, 2016

(30) Foreign Application Priority Data

Sep. 18, 2013 (JP) .................................. 2013-192865

(51) Int. Cl.
*F24F 6/02* (2006.01)
*F24F 6/04* (2006.01)
(Continued)

(52) U.S. Cl.
CPC .............. *F24F 6/025* (2013.01); *F24F 3/166* (2013.01); *F24F 6/04* (2013.01); *F24F 11/30* (2018.01);
(Continued)

(58) Field of Classification Search
CPC .... F24F 6/02; F24F 6/025; F24F 3/166; F24F 2003/1682; F24F 2110/10; F24F 2110/20
See application file for complete search history.

(56) References Cited

U.S. PATENT DOCUMENTS 5,445,798 A * 8/1995 Ikeda ..................... A23L 3/3409
422/121
2003/0072675 A1* 4/2003 Takeda ...................... A61L 9/22
422/22

(Continued)

FOREIGN PATENT DOCUMENTS

JP  59-168518 A  9/1984
JP  7-103522 A  4/1995
(Continued)

OTHER PUBLICATIONS

Office Action dated Jul. 5, 2016 in Japanese Patent Application No. 2015-537581 (with English language translation).
(Continued)

*Primary Examiner* — Nelson J Nieves
*Assistant Examiner* — Meraj A Shaikh
(74) *Attorney, Agent, or Firm* — Xsensus LLP

(57) ABSTRACT

A humidifier includes: a electrode; a water absorbing humidification member configured to serve as a counter electrode for the electrode; a power supply for applying a voltage to the electrode; a water supply unit for supplying humidification water to the water absorbing humidification member; and a blower for causing air to flow through an air passage formed in a space between the electrode and the water absorbing humidification member, the electrode being configured to generate, by receiving a voltage applied thereto, ion wind flowing from the electrode to a direction normal to a surface of the water absorbing humidification member, and the ion wind is caused to impinge on the water
(Continued)

absorbing humidification member to humidify the air in the air passage.

15 Claims, 10 Drawing Sheets

(51) Int. Cl.
*F24F 11/00* (2018.01)
*F24F 3/16* (2006.01)
*F24F 11/30* (2018.01)
*F24F 110/10* (2018.01)
*F24F 110/20* (2018.01)

(52) U.S. Cl.
CPC ... *F24F 2003/1682* (2013.01); *F24F 2110/10* (2018.01); *F24F 2110/20* (2018.01)

(56) References Cited

U.S. PATENT DOCUMENTS

| | | | | |
|---|---|---|---|---|
| 2007/0063659 | A1* | 3/2007 | YAamashita | H05B 41/042 315/360 |
| 2008/0170971 | A1* | 7/2008 | Bergeron | A61L 9/205 422/171 |
| 2012/0126041 | A1* | 5/2012 | Nunomura | B05B 5/0531 239/699 |
| 2013/0071298 | A1* | 3/2013 | Tanimura | B03C 3/014 422/187 |
| 2013/0313729 | A1* | 11/2013 | Sakai | F24F 6/04 261/130 |
| 2015/0285515 | A1* | 10/2015 | Lee | F24F 7/08 454/249 |

FOREIGN PATENT DOCUMENTS

| | | |
|---|---|---|
| JP | 7-305883 A | 11/1995 |
| JP | 2003-294276 A | 10/2003 |
| JP | 2009-243703 A | 10/2009 |
| JP | 2010-276296 A | 12/2010 |
| JP | 2012-42139 A | 3/2012 |
| JP | 2013-78481 A | 5/2013 |

OTHER PUBLICATIONS

Combined Office Action and Search Report dated Dec. 1, 2017 in Chinese Patent Application No. 201480051462.4 (with English translation and English translation of category of cited documents).
Chinese Office Action dated Apr. 20, 2018 in Chinese Patent Application No. 201480051462.4 (with English translation).
International Search Report dated Sep. 22, 2014 in PCT/JP2014/066357 filed Jun. 19, 2014.

* cited by examiner

FIG. 5

| | FLAT SHAPE (A) | QUADRAN-GULAR PRISM SHAPE (B) | COLUM-NAR SHAPE (C) | HOLLOW CYLIND-RICAL SHAPE (D) | QUADRAN-GULAR TUBE SHAPE (E) | TRIAN-GULAR TUBE SHAPE (F) |
|---|---|---|---|---|---|---|
| TOP VIEW | ▬ | ■ | ● | ◎ | ▢ | △ |
| SIDE VIEW | □ | □ | □ | ▯▯ | ▯▯ | ▯▯ |

FIG. 6

| | TRIANGULAR SHAPE (A) | NEEDLE SHAPE (B) | SAWTOOTH SHAPE (C) |
|---|---|---|---|
| TOP VIEW | ▽ | ⊤ | W |
| SIDE VIEW | □ | □ | □ |

HUMIDIFIER AND AIR-CONDITIONING APPARATUS INCLUDING HUMIDIFIER

TECHNICAL FIELD

The present invention relates to a humidifier using ion wind and an air-conditioning apparatus including the humidifier.

BACKGROUND ART

The Building Sanitation Control Act provides that temperature be maintained at 17 degrees C. to 28 degrees C. and relative humidity be maintained at 40% to 70% as control standard values for the air environment in specific buildings such as commercial facilities and offices having floor areas of 3,000 $m^2$ or more. In addition, the American Society of Heating, Refrigerating and Air-Conditioning Engineers (ASHRAE) specifies relative humidity of 30% to 60% as a humidity standard. The temperature is controlled relatively easily along with the growing use of air-conditioners. However, it is hard to say that the relative humidity is controlled sufficiently. In particular, lack of the amount of humidification in winter is a challenge to overcome.

Evaporative, steam, and water spray methods are known as examples of conventional indoor humidification methods. The evaporative method is a method of causing air to pass through a filter having a water absorption capacity to exchange heat between water contained in the filter and airflow, thereby evaporating the water for indoor humidification. The steam method energizes heating coils arranged inside a water reservoir, thereby evaporating water for indoor humidification. The water spray method is a method of atomizing water through pressurization to exchange heat between the atomized water and the airflow, thereby performing indoor humidification.

In Patent Literature 1, there is disclosed a humidifier including a humidifying element, a water supply device for supplying water to the humidifying element, an electrode, a counter electrode and a high-voltage generating apparatus. The humidifying element is interposed between the electrode and the counter electrode, and is not in direct contact with the electrode. The high-voltage generating apparatus is for forming an electric field between the electrode and the counter electrode, and applying the electric field to the humidifying element to accelerate evaporation of the water.

Moreover, in Patent Literature 2, there is disclosed a humidifier including a humidifying element, a water supply device for supplying water to the humidifying element, a plurality of electrodes arranged on an inlet side of an airflow of air to be humidified, a counter electrode having a shape that is not in contact with the electrodes and does not intercept the airflow, and a high-voltage generating apparatus for generating ion wind in the same direction as the airflow.

CITATION LIST

Patent Literature

Patent Literature 1: Japanese Unexamined Patent Application Publication No. Hei 7-103522
Patent Literature 2: Japanese Unexamined Patent Application Publication No. Hei 7-305883

SUMMARY OF INVENTION

Technical Problem

In Patent Literature 1, there is disclosed the humidifier including the electrode, and the counter electrode, which is not in direct contact with the electrode, in which the electric field is formed between the electrode and the counter electrode to perform humidifying by the water contained in the humidifying element, and the water is evaporated with an evaporation acceleration effect of the electric field. However, the electric field is formed along a surface of a humidification member in parallel with the humidification member, and hence the evaporation acceleration effect does not work in a direction perpendicular to the surface of the humidification member. Therefore, a layer of saturated air (hereinafter referred to as "saturated air layer") that is close to the surface of the humidification member and has a high water concentration cannot be agitated, which leads to a thick water vapor saturation layer near the surface of the humidification member, and to a small gradient difference between a water concentration in inlet air and a concentration of water contained in the humidification member, with the result that there has been a problem in that an improvement in humidification performance cannot be expected.

Moreover, in Patent Literature 2, there is disclosed the structure including, on the side of an upstream portion of the humidifying element, the electrodes, and the counter electrode that is not in direct contact with the electrodes, in which the ion wind is generated in the same direction as the airflow. However, similarly to Patent Literature 1, the ion wind flows on a side surface of the humidification member in parallel with the humidification member, which means that turbulence does not occur in the wind in a direction normal to the surface of the humidification member, and that the saturated air layer near the humidification member cannot be agitated, with the result that there has been the problem in that the improvement in humidification performance cannot be expected.

The present invention has been made in order to solve the above-mentioned problem, and therefore has an object to provide a humidifier in which ion wind causes turbulence in a saturated air layer near a water absorbing humidification member to facilitate replacement with air that is caused to flow by a blower, and in which a gradient difference in water concentration from the water absorbing humidification member is increased to improve humidification performance, and an air-conditioning apparatus including the humidifier.

Solution to Problem

According to one embodiment of the present invention, there is provided a humidifier, an electrode being conductive;
a water absorbing humidification member to serve as a counter electrode for the electrode; a power supply to apply a voltage to the electrode; a water supply unit to supply humidification water to the water absorbing humidification member; and a blower to cause air to flow through an air passage formed in a space between the electrode and the water absorbing humidification member, the electrode being configured to generate, by receiving a voltage applied thereto, ion wind flowing from the electrode to a direction normal to a surface of the water absorbing humidification member, and impinging on the water absorbing humidification member to humidify the air in the air passage.

Advantageous Effects of Invention

With the humidifier according to the one embodiment of the present invention, the saturated air layer of vapor near the surface of the water absorbing humidification member may be agitated by applying the voltage to the electrode to generate the ion wind between the electrode and the water absorbing humidification member and causing the ion wind to impinge on the surface of the water absorbing humidification member that is opposed to the electrode from the normal direction. Therefore, the saturated air layer near the water absorbing humidification member may be replaced with an air layer having a lower water concentration than that of the saturated air layer, and a gradient difference in water concentration from the water absorbing humidification member may be increased, with the result that the humidification performance may be improved.

BRIEF DESCRIPTION OF DRAWINGS

FIG. 5 is a schematic diagram illustrating examples of a shape of the water absorbing humidification member.
FIG. 6 is a schematic diagram illustrating examples of a shape of a protruding portion of an electrode.

DESCRIPTION OF EMBODIMENTS

Figure 1:
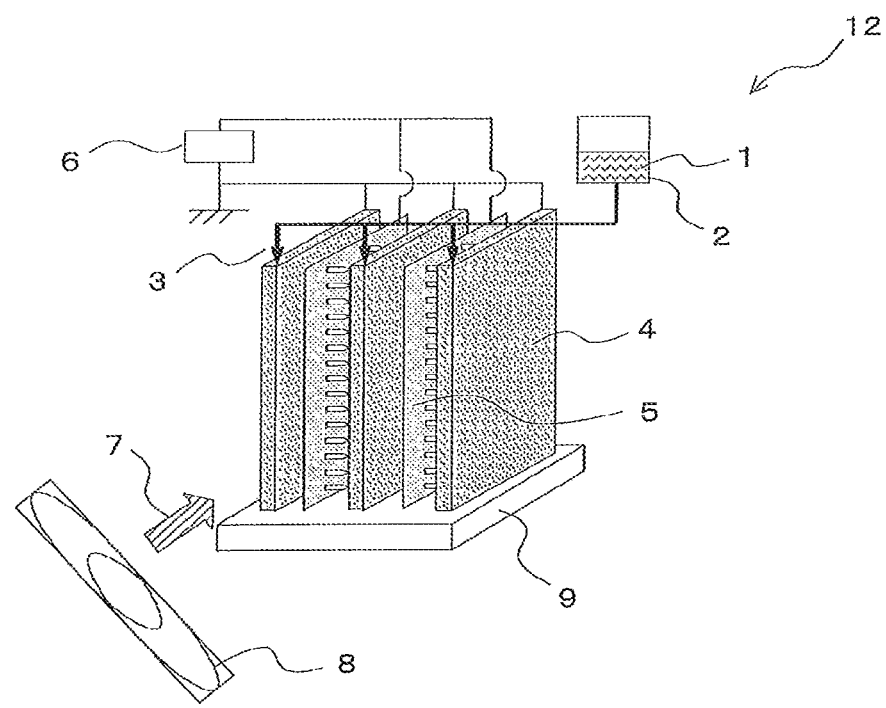
FIG. 1 is a structural view of a humidifier according to Embodiment 1 of the present invention.

Now, embodiments of the present invention are described with reference to the drawings. Note that, the present invention is not limited to the embodiments described below. Moreover, in the drawings referred to below, the size relationship between components may be different from the reality in some cases.

Embodiment 1

(Structure of Humidifier)
FIG. 1 is a structural view of a humidifier 12 according to Embodiment 1 of the present invention.
As illustrated in FIG. 1, the humidifier 12 according to Embodiment 1 includes a supply unit 2 for storing humidification water 1 to be used for humidifying a space to be humidified, nozzles 3 serving as water supply units for supplying the humidification water 1 from the supply unit 2 to water absorbing humidification members 4, at least one water absorbing humidification member 4 arranged in an upright posture, which has the same potential as a ground potential, electrodes 5 opposed to surfaces of the water absorbing humidification members 4 over a predetermined distance, a power supply 6 for applying a voltage to the electrodes 5, a blower 8 for causing air 7 to flow through a space between the water absorbing humidification member 4 and the electrode 5, and a drain pan 9 for receiving surplus water from the water absorbing humidification member 4.

Note that, in practical use, the supply unit 2, the nozzles 3, the water absorbing humidification members 4, the electrodes 5, the power supply 6, the blower 8, and the drain pan 9 may be fixed by a predetermined support or the like. The structure of the support is not particularly limited, and only needs to be selected as appropriate depending on the usage of the humidifier 12. Moreover, each of the electrodes 5 according to Embodiment 1 is opposed to the entire surface of the water absorbing humidification member 4.

Figure 2:
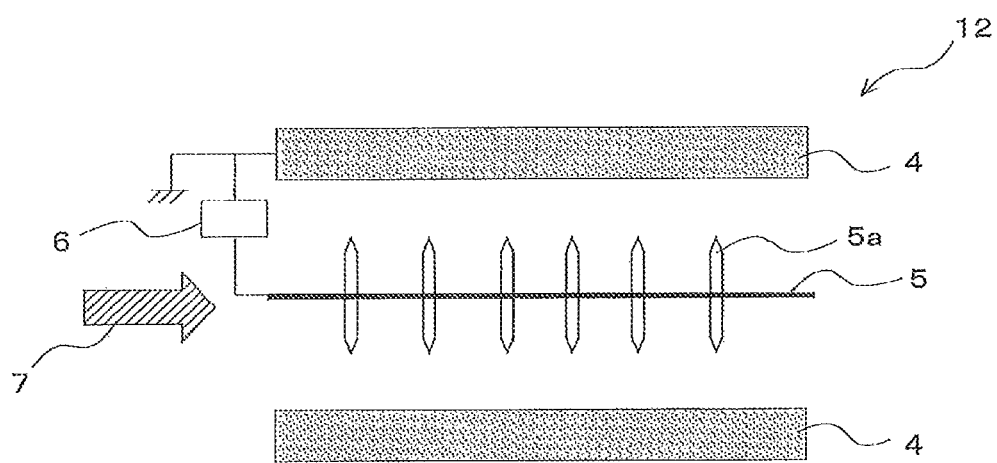
FIG. 2 is a structural view of the humidifier according to Embodiment 1 of the present invention when viewed from above.
Figure 3:
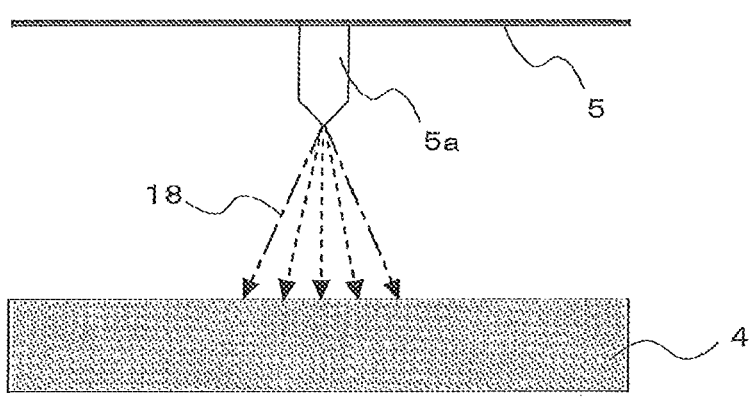
FIG. 3 is a partially enlarged view of FIG. 2.
Figure 4:
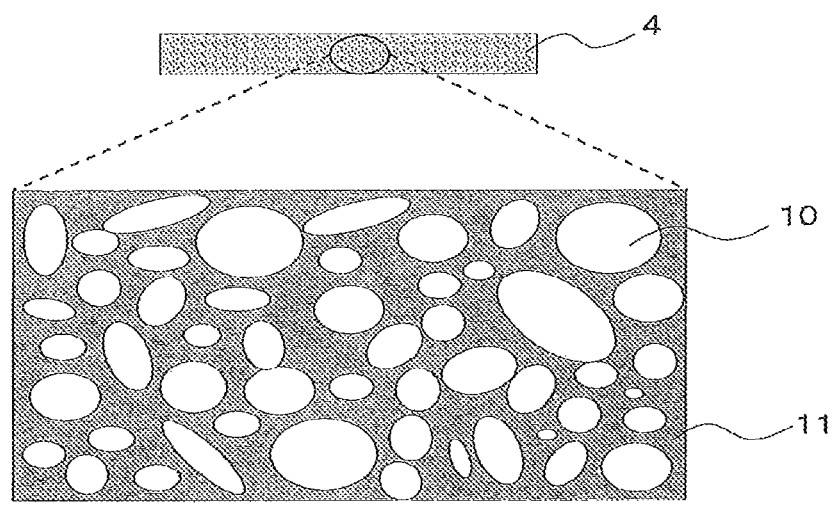
FIG. 4 is a partially enlarged sectional view of a water absorbing humidification member of FIG. 2.

FIG. 2 is a structural view of the humidifier 12 according to Embodiment 1 of the present invention when viewed from above, FIG. 3 is a partially enlarged view of FIG. 2, and FIG. 4 is a partially enlarged sectional view of the water absorbing humidification member 4 of FIG. 2.

As illustrated in FIG. 2, on both surfaces of the electrode 5, conductive protruding portions 5a are formed perpendicularly to the surfaces of the water absorbing humidification members 4 opposed to the electrode 5. Moreover, as illustrated in FIG. 3, when the voltage is applied to the electrode 5, ion wind 18 is generated from the protruding portion 5a in a direction normal to the surface of the water absorbing humidification member 4. Then, the ion wind 18 may impinge on the water absorbing humidification member 4 to significantly improve humidification performance. Note that, this principle is described later.

As the humidification water 1, any of pure water, tap water, soft water, and hard water may be used when the humidification water 1 is used for humidifying the space to be humidified. To reduce clogging of pores 10 of the water absorbing humidification member 4 illustrated in FIG. 4, which may be caused due to scales as typified by calcium carbonate scale, however, it is preferred to use water with a low content of mineral components including calcium ions or magnesium ions. This is because the use of humidification water with a high mineral content may cause the clogging of the pores 10 of the water absorbing humidification member 4 due to solids generated through reaction between ionic components in a solution and carbon dioxide. Note that, humidification water whose ionic components are removed with an ion exchange membrane for cations and anions or the like may be used instead. Moreover, the pores 10 of the water absorbing humidification member 4 are described later.

The supply unit 2 stores the humidification water 1 to be supplied to the water absorbing humidification members 4. The supply unit 2 uses a drive unit such as a pump to supply the humidification water 1 by dripping to upper portions of the water absorbing humidification members 4 through the nozzles 3. Moreover, it is only necessary that the drive unit be capable of transporting the humidification water 1. For example, the drive unit is a non-positive displacement pump or a positive displacement pump, and is not particularly limited.

The nozzle 3 is arranged directly above the water absorbing humidification member 4 to supply the humidification water 1 conveyed from the supply unit 2 to the upper portion of the water absorbing humidification member 4 by dripping. The nozzle 3 has a hollow shape, and the outer diameter and the inner diameter of the nozzle 3 only need to be selected depending on the size of the water absorbing humidification member 4. Further, the distal end of the nozzle 3 may have any shape such as a triangular pyramid shape, a quadrangular pyramid shape, a circular tube shape, or a square tube shape. In this case, the distal end has a triangular pyramid shape as a preferred shape thereof, and an outlet of the nozzle 3 has a hole diameter of 0.5 mm. It is preferred that the nozzle 3 have an acute distal end because water droplets are well dripped off the nozzle 3. It is also preferred that the nozzle 3 have a more acute distal end, but when the distal end is excessively acute, the nozzle 3 is difficult to handle and reduced in strength. For this reason, it is preferred that the acute angle fall within a range of from 10 degrees to 45 degrees.

Further, when the hole diameter of the outlet of the nozzle 3 is excessively large, the humidification water 1 is excessively supplied so that the amount of unnecessary water is increased. When the hole diameter of the outlet of the nozzle 3 is excessively small, on the other hand, the nozzle 3 may be clogged with particles or scales mixed into the humidification water 1. For this reason, it is preferred that the hole diameter fall within a range of from 0.1 mm to 0.6 mm. Moreover, a material for the nozzle 3 may be a metal such as stainless steel, tungsten, titanium, silver, or copper, or a resin such as PTFE, polyethylene, or polypropylene. However, the material for the nozzle 3 is not limited thereto.

It should be noted, however, that in a case where an inexpensive copper pipe is used as a distributing pipe connected to the nozzles 3, when the material for the nozzles 3 is polypropylene, polypropylene is degraded due to a catalytic action of copper. Therefore, if a resin is selected, PTFE or polyethylene is preferred.

Moreover, in a case where a length of the water absorbing humidification member 4 in an airflow direction (length from an upstream side to a downstream side) is large, only one nozzle 3 is not sufficient for length, and hence a plurality of nozzles may be used. Therefore, one nozzle 3 may suffice when the length in the airflow direction is 60 mm or less, for example, but a plurality of nozzles are preferred when the length in the airflow direction is more than 60 mm.

It is necessary that the amount of the humidification water 1 be set larger than the amount of water to be used for actual humidification. When the amount of the humidification water 1 is set excessively large, however, unnecessary water is increased. For this reason, it is desired that the amount of the humidification water 1 be controlled appropriately. For example, when each water absorbing humidification member 4 has a humidification performance of 2,000 mL/h/m$^2$ and a size of 200 mm by 50 mm, and when humidification can be achieved on both front and back sides of the water absorbing humidification member 4, the humidification amount of a single water absorbing humidification member 4 is 40 mL/h. Therefore, it is desired that the humidification water 1 be supplied by an amount within a range of from 60 mL/h to 200 mL/h, which is 1.5 times to 5 times as large as the humidification amount.

Further, a water absorbing member made of a fiber, a resin, or a metal may be arranged in contact with the water absorbing humidification member 4 at a position between the nozzle 3 and the water absorbing humidification member 4. In a case where a plurality of water absorbing humidification members 4 are arranged, the number of the nozzles 3 is increased, which may result in failure to drip water appropriately. Therefore, the water absorbing member is arranged in contact with the water absorbing humidification members 4 so that, even when the plurality of water absorbing humidification members 4 are arranged, the humidification water 1 may be supplied reliably.

The water absorbing humidification member 4 has a shape having, for example, a three-dimensional mesh structure. The three-dimensional mesh structure refers to a structure similar to that of resin foam having high water absorption property, such as sponge. As illustrated in FIG. 4, the water absorbing humidification member 4 includes a body 11, and a plurality of pores 10 formed in the body 11. It is conceivable that the water absorbing humidification member 4 according to Embodiment 1 is made of a material such as a porous metal, ceramic, resin, nonwoven fabric, or fiber, and each of those materials is formed into foam or mesh. The water absorbing humidification member 4 needs to function as the counter electrode for the electrode 5, and hence the water absorbing humidification member 4 needs to be conductive.

When the water absorbing humidification member 4 is made of a metal, the kind of metal is not particularly limited, and examples thereof include a metal such as titanium, copper, or nickel, a precious metal such as gold, silver, or platinum, and an alloy such as a nickel alloy or a cobalt alloy. Those materials may be used alone or in combination. Moreover, those metals may be plated with zinc, nickel, tin, chromium, copper, silver, gold, or the like. Among those materials, titanium is a most preferred kind of metal because titanium suppresses generation of corona products such as ozone due to its catalytic effect, has excellent resistance to electric corrosion and electric abrasion, and further retains the shape of the water absorbing humidification member 4 over a long period of time to enable stable humidification.

When the water absorbing humidification member 4 is made of a ceramic, examples of a material therefor include alumina, zirconia, mullite, cordierite, and silicon carbide, but the material is not limited thereto.

When the water absorbing humidification member 4 is made of a resin, a material therefor is not particularly limited, and examples thereof include polyethylene, polypropylene, and an ethylene-vinyl acetate copolymer, but the material is not limited thereto.

When the water absorbing humidification member 4 is made of a fiber, examples of a material therefor include acetate, polyester, and nylon, but the material is not limited thereto. In addition, a fiber obtained by coating a porous substance formed by using a resin as a material with metal powder may also be used.

The surface layer of the water absorbing humidification member 4 may be subjected to hydrophilic treatment from the viewpoint of increasing the amount of the humidification water 1 to be retained and preventing degradation of a water absorption capacity. The types of method of hydrophilic treatment are not limited as well. For example, the hydrophilic treatment may be performed by coating with a hydrophilic resin, or by corona discharge.

FIG. 5 is a schematic diagram illustrating examples of a shape of the water absorbing humidification member 4.

The shape of the water absorbing humidification member 4 is not particularly limited as well. For example, as illustrated in FIG. 5, the water absorbing humidification member 4 may have a flat shape (A), a quadrangular prism shape (B), or a columnar shape (C). Alternatively, the water absorbing humidification member 4 may have a circular tube shape (D), a quadrangular tube shape (E), or a triangular tube shape (F) each having a hollow inside thereof. The shape only needs to be adjusted as appropriate depending on the size of the humidifier 12 to be manufactured.

Moreover, the thickness of the water absorbing humidification member 4 only needs to be adjusted as appropriate depending on the size of the humidifier 12 to be manufactured. For example, a sheet-like water absorbing humidification member 4 having a thickness of 0.5 mm or more and 2 mm or less may be manufactured and then processed into a desired shape by cutting. The processing method is not particularly limited, and for example, various methods such as wire cutting, laser cutting, press stamping, shaving, and manual cutting or bending may be employed.

The electrode 5 needs to be electrically conductive in order to form corona discharge in the space between the electrode 5 and the water absorbing humidification member 4, and it is preferred that the electrode 5 be made of a material such as, for example, a metal, a metal alloy, or a conductive resin. Moreover, the electrode 5 may be made of a porous metal, conductive resin, or metal-containing ceramic having water absorption property. The electrode 5 may be made of a material having a low electrical resistance, and it is preferred that the electrode 5 be made of aluminum, copper, stainless steel, or the like from the viewpoints of general-purpose properties and processability, but the material is not limited thereto. Moreover, the size of the electrode 5 is not particularly limited as well, and only needs to be adjusted as appropriate depending on the size of the humidifier to be manufactured.

Figure 7:
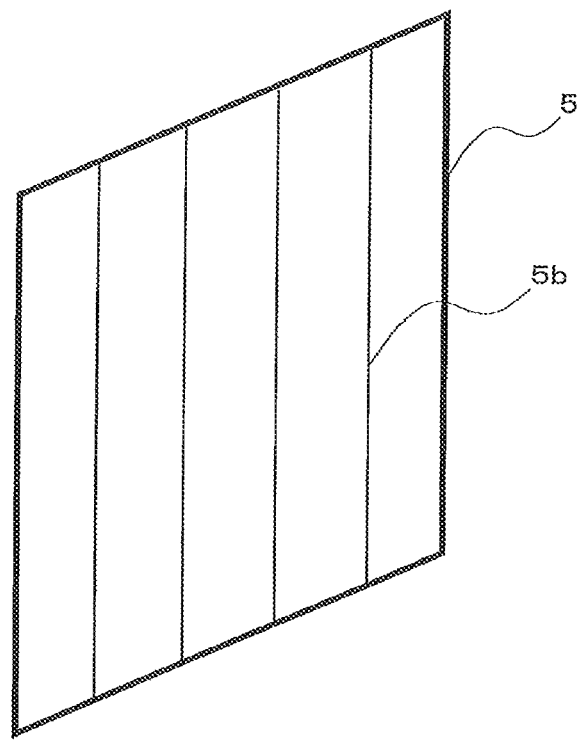
FIG. 7 is a schematic view of an electrode in which wires are arranged.

FIG. 6 is a schematic diagram illustrating examples of a shape of the protruding portion 5a of the electrode 5, and FIG. 7 is a schematic view of the electrode 5 in which wires 5b are arranged. In FIG. 6, the bold line in the top views indicates the electrode 5, and the outer quadrangle in the side views indicates the water absorbing humidification member 4.

It is desired that the electrode 5 have a shape that facilitates occurring of the corona discharge between the electrode 5 and the water absorbing humidification member 4, and it is preferred that the electrode 5 have the protruding portion 5a, which has a shape such as a triangular shape (A), a needle shape (B), or a sawtooth shape (C) as illustrated in FIG. 6, or have a wire shape in which the conductive wires 5b are arranged in the electrode 5 as illustrated in FIG. 7. The top views in FIG. 6 are views when the electrode 5 is viewed from the upper side of FIG. 1, and the side views in FIG. 6 are views when the electrode 5 is viewed from the right side of FIG. 1.

Note that, the triangular shape (A) indicates an electrode 5 having a shape in which a plurality of protruding portions 5a each having the triangular shape are arranged in a row direction and/or a column direction, or a shape in which the protruding portions 5a are arranged in a staggered manner.

Similarly, the needle shape (B) indicates an electrode 5 having a shape in which a plurality of protruding portions 5a each having the needle shape are arranged in the row direction and/or the column direction, or a shape in which the protruding portions 5a are arranged in a staggered manner. The sawtooth shape (C) indicates an electrode 5 in which metal plates, each having protrusions in an edge thereof, are arranged in the row direction or the column direction.

Moreover, the electrode 5 having the wire shape refers to an electrode 5 in which, as illustrated in FIG. 7, the wires 5b each having a diameter of from 0.1 mm to 1 mm are arranged at regular intervals. In this configuration, the voltage is applied to the electrode 5, the water absorbing humidification member 4 is grounded, so that electric field strengths around the wires 5b can be increased to generate the corona discharge. Therefore, the ion wind 18 can be generated in the direction normal to the surface of the water absorbing humidification member 4. Note that, it is desired that the protruding portion 5a of the electrode 5 be formed in a direction perpendicular to the surface of the water absorbing humidification member 4 opposed to the electrode 5, but the protruding portion 5a may be formed at a given angle of less than 90 degrees in the same direction as the airflow direction from the blower 8. This may align the airflow direction of the blower 8 and the airflow direction of the ion wind 18, and hence reduce a pressure loss due to the ion wind 18.

The power supply 6 is connected to the electrode 5 and applies a (high) voltage to the electrode 5 to cause the corona discharge in the space between the electrode 5 and the water absorbing humidification member 4. In this case, in order to cause the corona discharge from the electrode 5 to the water absorbing humidification member 4, it is desired that the water absorbing humidification member 4 be grounded, and that the electrode 5 arranged at an opposed portion be applied with the voltage. The reason for preferably employing this configuration is that, when the voltage is applied to the water absorbing humidification member 4 containing the humidification water 1, the water absorbing humidification member 4 may be degraded due to electric corrosion.

Figure 8:
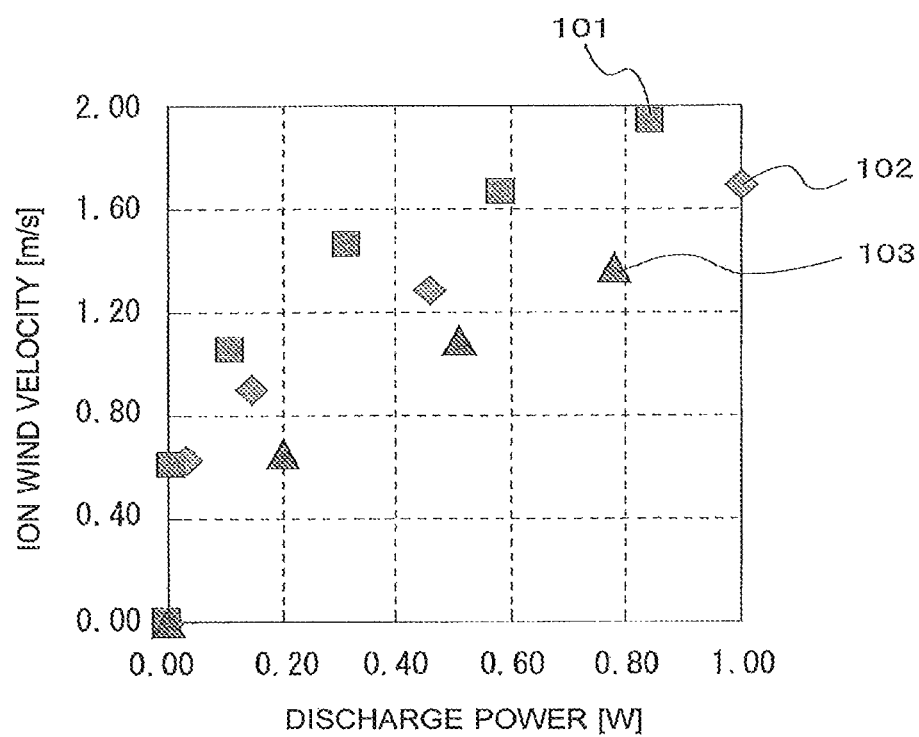
FIG. 8 is a graph showing relationships between an air velocity of ion wind and discharge power depending on a polarity applied to the electrode.

FIG. 8 is a graph showing relationships between an air velocity of the ion wind 18 and discharge power depending on a polarity of voltage applied to the electrode 5. Note that, the discharge power is a value expressed by a product of a value of the voltage applied to the electrode 5 and a current discharged from the electrode 5 to the water absorbing humidification member 4. Results in FIG. 8 are obtained when protruding portions 5a, the number of which is 15 in total, are arranged vertically in three columns and horizontally in five rows on one side of the electrode 5.

In FIG. 8, results of measuring the air velocity of the ion wind 18 flowing in the direction normal to the surface of the water absorbing humidification member 4 in cases where a positive DC voltage 101, a negative DC voltage 102, and an AC voltage 103 having a frequency of 60 Hz are applied to the electrode 5, respectively, are shown.

The air velocity near the surface of the water absorbing humidification member 4 is the highest in the case where the positive DC voltage 101 is applied to the electrode 5, followed by the case of the negative DC voltage 102 and the AC voltage 103 in the descending order of velocity. This is because mobility of ions as a drive source for the ion wind 18 is different for each polarity: the air velocity of the ion wind 18 is high for positive ions having high mobility, and the air velocity of the ion wind 18 is low for negative ions having smaller mobility than that of the positive ions.

Moreover, the AC voltage 103 has a non-discharge period, and hence the air velocity of the ion wind 18 is lower than those of the positive DC voltage 101 and the negative DC voltage 102. Therefore, in order to maximize the effect of causing turbulence of the air 7 near the surface of the water absorbing humidification member 4, it is preferred that the polarity of the power supply 6 be the positive DC voltage 101.

Figure 9:
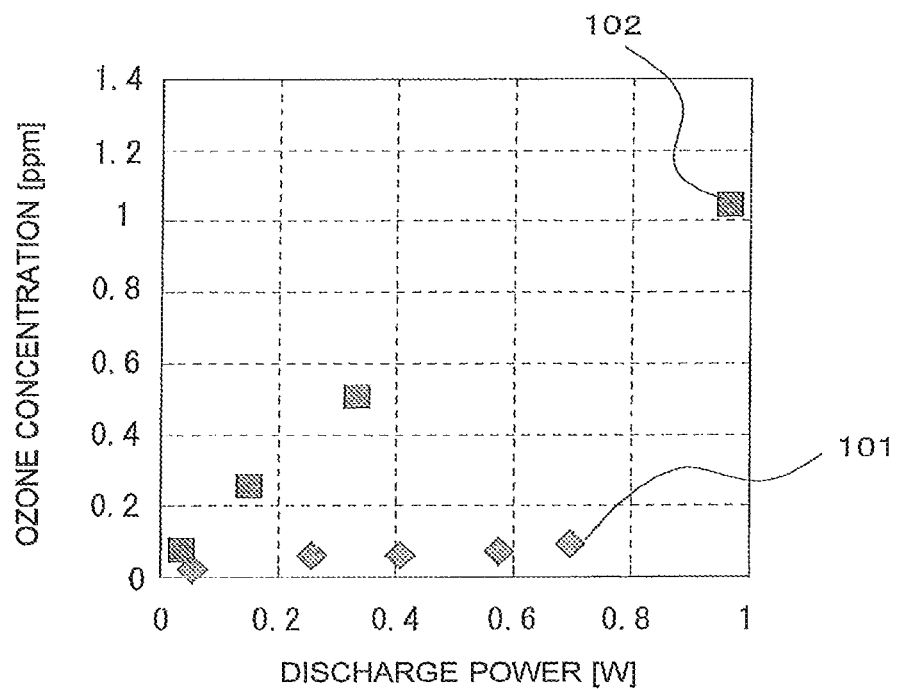
FIG. 9 is a graph showing relationships between an ozone emission concentration and the discharge power depending on the polarity applied to the electrode.

FIG. 9 is a graph showing relationships between an ozone emission concentration and the discharge power depending on the polarity applied to the electrode 5.

In FIG. 9, a result of comparing concentrations of ozone emitted from an outlet of the humidifier 12 in the cases where the positive DC voltage 101 and the negative DC voltage 102 are applied to the electrode 5 is shown.

Note that, the results are obtained by setting a distance between the water absorbing humidification member 4 and the distal end of the protruding portion 5a of the electrode 5 to 5 mm, and causing the wind to flow from the blower 8 through the space between the water absorbing humidification member 4 and the electrode 5 at the air velocity of 2.5 m/s.

The concentration of ozone emitted from the humidifier 12 is lower with the positive DC voltage 101 than with the negative DC voltage 102. With the positive DC voltage 101, a probability of electron collision with oxygen molecules and a concentration of ozone than those with the negative DC voltage 102 result, because the number of electrons emitted from the electrode 5 is smaller with the positive DC voltage 101 than with the negative DC voltage. Therefore, it is preferred that the polarity of the power supply 6 be the positive DC voltage 101 in terms of reducing the amount of ozone emitted from the humidifier 12.

Moreover, a superimposed pulse voltage obtained by superimposing a pulse voltage on a DC voltage may be applied to the electrode 5. In this case, a DC voltage that is equal to or lower than a voltage at the time of starting discharge is applied to the electrode 5 to form an electrostatic field, and the pulse voltage is superimposed on the DC voltage, with the result that ions emitted by the pulse voltage are accelerated by the electrostatic field to generate the ion wind 18.

As described above, applying the DC voltage that is equal to or lower than the voltage at the time of starting discharge to the electrode 5 and superimposing the pulse voltage having a given frequency may generate the ion wind 18 with low power consumption and a low amount of generated ozone, and hence facilitate humidification.

Note that, an input value of the DC voltage and an input value of the pulse voltage can be determined in accordance with the distance between the water absorbing humidification member 4 and the distal end of the protruding portion 5a of the electrode 5. Moreover, the frequency of the pulse voltage, and a duty ratio defined by a pulse width and the frequency can be determined depending on the specifications.

It is desired that the distance between the water absorbing humidification member 4 and the distal end of the protruding portion 5a of the electrode 5 be 3 mm or more. If the distance is less than 3 mm, when the positive DC voltage 101 is applied to the electrode 5, glow corona directly proceeds to spark discharge, and hence the ion wind 18 is not generated, with the result that a layer of saturated air (hereinafter referred to as "saturated air layer") having a high water concentration near the surface of the water absorbing humidification member 4 cannot be agitated.

The blower 8 is configured to cause the air 7 to flow through an air passage for the air 7, which is formed in the space between the water absorbing humidification member 4 having the same potential as the ground potential and the electrode 5 along the surface of the water absorbing humidification member 4, and only needs to be selected as appropriate from among a sirocco fan, a propeller fan, a line flow fan, and the like.

Figure 10:
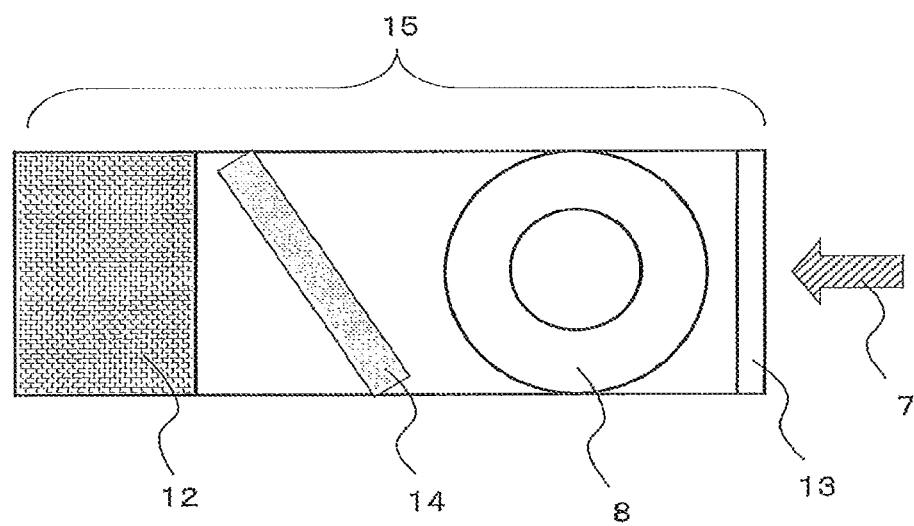
FIG. 10 is a structural view illustrating an example of an air-conditioning apparatus including the humidifier according to Embodiment 1.

FIG. 10 is a structural view illustrating an example of an air-conditioning apparatus 15 including the humidifier 12 according to Embodiment 1.

The air-conditioning apparatus 15 including the humidifier 12 according to Embodiment 1 includes, as illustrated in FIG. 10, the humidifier 12 including the blower 8, a filter 13, and a heat exchanger 14, and the humidifier 12 is arranged on a downstream side of the heat exchanger 14 to cause the air 7 that has exchanged heat in the heat exchanger 14 to flow therethrough to humidify a space.

(Operation of Humidifier)

Next, the humidifier 12 according to Embodiment 1 and the air-conditioning apparatus 15 including the humidifier 12 are described with reference to FIG. 1.

The humidification water 1 stored in the supply unit 2 is conveyed to the nozzles 3, and the nozzles 3 having the humidification water 1 conveyed thereto drip the humidification water 1 from above the water absorbing humidification members 4 toward the upper portions of the water absorbing humidification members 4 to supply the humidification water 1 to the water absorbing humidification members 4. The water absorbing humidification member 4 has a capillary force and can utilize a gravity of the humidification water 1. Therefore, the humidification water 1 is dispersed homogeneously in the entire water absorbing humidification member 4 through the pores 10 of the water absorbing humidification member 4. Moreover, the water absorbing humidification member 4 retains a given amount of the humidification water 1.

As illustrated in FIG. 1, the blower 8 causes the air 7 to flow from the upstream side of the water absorbing humidification member 4 through the space between the water absorbing humidification member 4 and the electrode 5 in parallel with the surface of the water absorbing humidification member 4. This causes the air 7 to be evaporated through gas-liquid contact with the surface of the water absorbing humidification member 4 to humidify the space. At this time, when the voltage is applied from the power supply 6 to the electrode 5, the corona discharge occurs from the electrode 5 to the water absorbing humidification member 4 having the same potential as the ground potential. Then, charges emitted from the electrode 5 by the corona discharge adhere to substances having high electroaffinity in the air to generate ions. Generated ionic species are accelerated by an electric field formed by the water absorbing humidification member 4 and the electrode 5 and move to the direction normal to the surface of the water absorbing humidification member 4 serving as a counter electrode. In a channel of the movement, collision with neutral molecules occurs, and the ions and the neutral molecules move toward the surface of the water absorbing humidification member 4 to generate wind called the ion wind 18.

Figure 11:
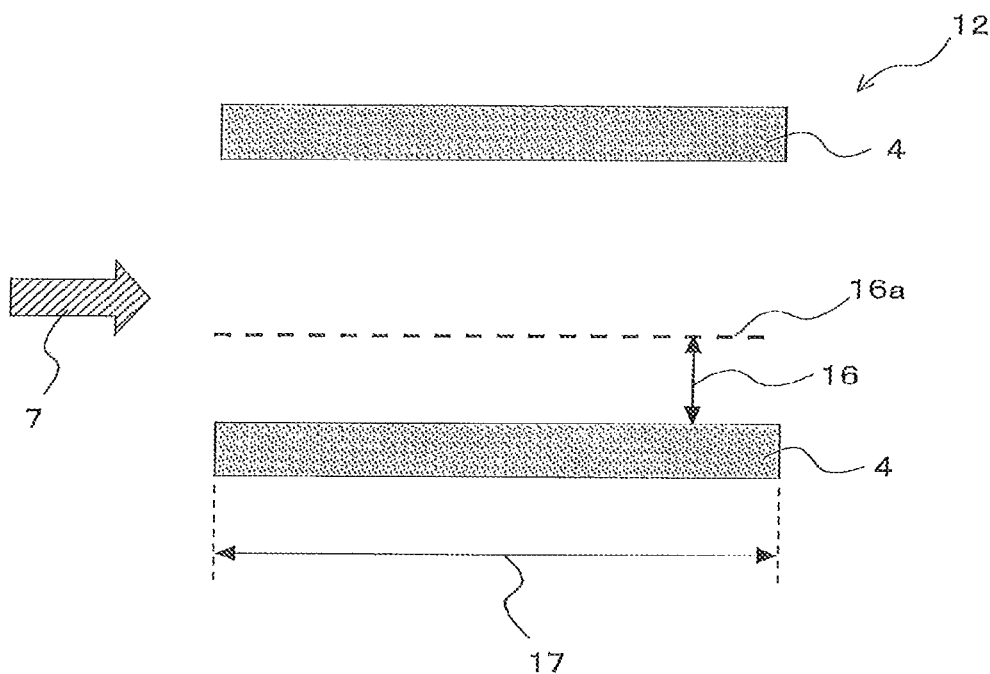
FIG. 11 is a principle diagram illustrating a mechanism of humidification.

FIG. 11 is a diagram illustrating a principle of mechanism of humidification.

The mechanism of humidification from the water absorbing humidification member 4 is described with reference to FIG. 11.

A phenomenon in which vapor is diffused from the water absorbing humidification member 4 containing the humidification water 1 into the air is controlled by a rate of diffusion $N_a$, and when a diffusion coefficient is represented by $D_e$, a water concentration in the air 7 is represented by $C_a$, a water concentration in the water absorbing humidification member 4 is represented by $C_o$, and a saturated air layer thickness is represented by δ, the rate of diffusion $N_a$ is given by the following equation (1).

[Math. 1]

$$N_a = D_e \times (C_o - C_a)/\delta \qquad (1)$$

Moreover, when a water absorbing humidification member depth 17 is represented by L, a Prandtl's constant is represented by $P_r$, an air density is represented by ρ, and a kinematic viscosity is represented by V, the saturated air layer thickness δ 16 is given by the following equation (2).

[Math. 2]

$$\delta = L/(0.644 \times P_r^{1/3} \times (\rho \times U \times L/V)^{1/2}) \qquad (2)$$

In the principle of humidification in which no voltage is applied, the saturated air layer thickness δ 16 is reduced due to a change in air velocity U of the air 7 based on the boundary layer equation expressed by the equation (2), and hence the rate of diffusion $N_a$ is increased based on the equation (1) to improve the humidification performance.

Figure 12:
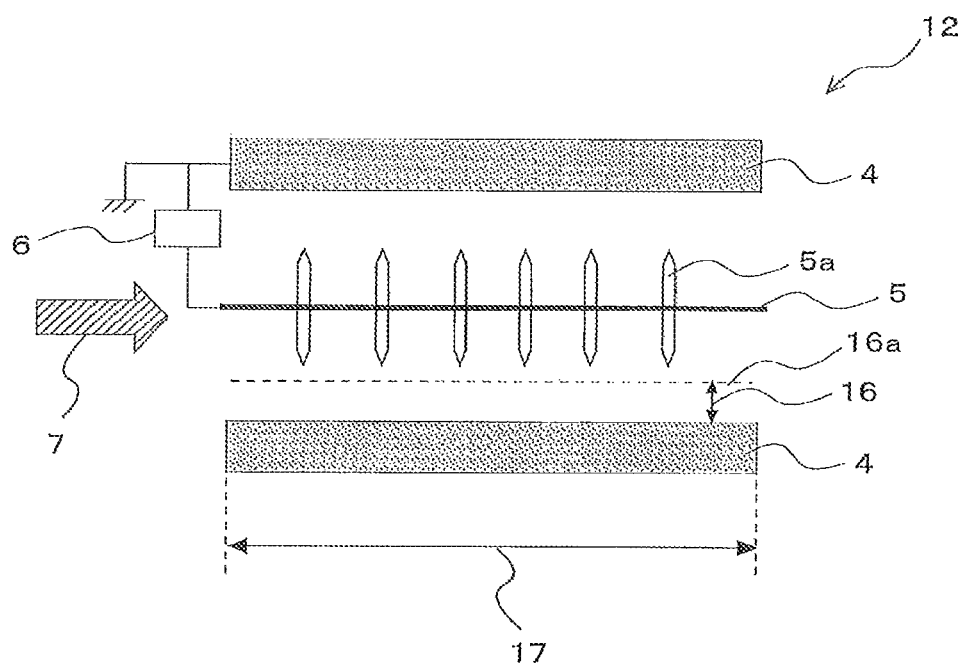
FIG. 12 is a principle diagram illustrating a mechanism of humidification using the ion wind.

FIG. 12 is a diagram illustrating a principle of mechanism of humidification using the ion wind 18.

As illustrated in FIG. 12, in the case where the corona discharge is caused from the electrode 5 to the water absorbing humidification member 4, in addition to the above-mentioned phenomenon, the ion wind 18 is caused to flow in the direction normal to the surface of the water absorbing humidification member 4 and impinge on the surface of the water absorbing humidification member 4, with the result that the air 7 having the lower water concentration than that of a saturated air layer 16a near the water absorbing humidification member 4 may be mixed into the saturated air layer 16a. Therefore, the difference between the water concentration $C_o$ in the water absorbing humidification member 4 and the water concentration $C_a$ in the air 7 may be increased, and hence the humidification performance may be improved significantly.

Here, as an example, it is assumed that in the humidifier 12 illustrated in FIG. 1, the distance between the water absorbing humidification member 4 formed of a porous metal and the distal end of the protruding portion 5a of the electrode 5 is set to 5 mm, a height of the protruding portion 5a of the electrode 5 is set to 2 mm, and air is caused to flow through the space between the water absorbing humidification member 4 and the electrode 5 at an average air velocity of 2.5 m/s by the blower 8. A humidification performance ratio in this configuration depending on the discharge power of the water absorbing humidification member 4 and the electrode 5 is examined, and results thereof are shown in FIG. 13.

Figure 13:
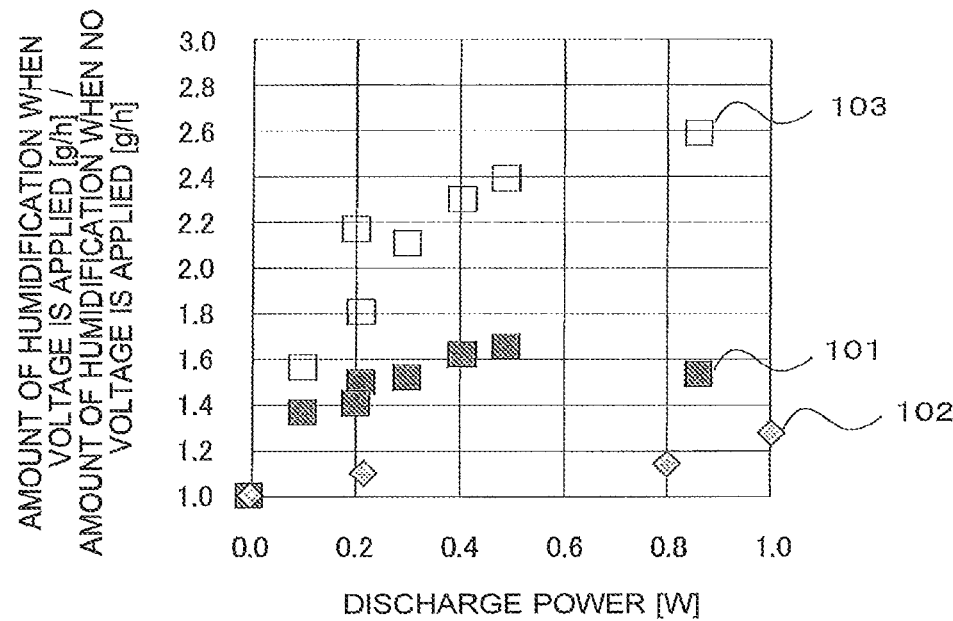
FIG. 13 is a graph showing performance evaluation results of the humidification using the ion wind.

FIG. 13 is a graph showing performance evaluation results of the humidification by the ion wind 18.

The horizontal axis in FIG. 13 represents the discharge power expressed as a product of the value of the voltage applied to the electrode 5 and a discharge current to the water absorbing humidification member 4, and the humidification performance ratio on the vertical axis represents, a humidification performance ratio by working of the ion wind 18 excluding evaporation performance due to Joule heat of the discharge, with reference to the humidification performance in the case where no voltage is applied to the electrode 5. Note that, in this examination, the positive DC voltage 101 is applied to the electrode 5, and the water absorbing humidification member 4 is grounded.

When the voltage is applied to the electrode 5, the ion wind 18 accompanying the corona discharge is generated, and the humidification performance is improved significantly as compared to the case where no voltage is applied. In particular, higher performance may be obtained with the positive DC voltage 101 than with the negative DC voltage 102. Therefore, when the humidity is low, the voltage applied to the electrode 5 may be increased to improve the humidification performance. Moreover, in a condition in which a saturation degree of the air 7 is increased by the humidification by the ion wind 18 to cause condensation, the voltage applied to the electrode 5 may be reduced to avoid the condensation on wall surfaces of the apparatus and the like. Note that, control on the voltage applied to the electrode 5 by the power supply 6 may allow the positive DC voltage 101 to have a large control range on the humidification performance. Note that, the control on the application of the voltage and the discharge current is performed by a CPU or the like mounted on a controller (not shown).

Moreover, the corona discharge is caused to work so that the Joule heat acts on the water absorbing humidification member 4, and hence the AC voltage 103 in consideration of the effect of the Joule heat to the positive DC voltage 101 facilitates the humidification more than the positive DC voltage 101.

Moreover, the air-conditioning apparatus 15 including the humidifier 12 takes the air 7 into the air-conditioning apparatus 15 by the blower 8 as illustrated in FIG. 10. The air 7 contains particulates, which are collected by the filter 13, the air 7 is heated or cooled by the heat exchanger 14, and the air 7 is caused to flow through the humidifier 12 to be humidified.

Effects of Embodiment 1

As in the above-mentioned structure, in the humidifier 12 according to Embodiment 1 and the air-conditioning apparatus 15 including the humidifier 12, the corona discharge may be caused from the electrode 5 to the water absorbing humidification member 4 having the same potential as the ground potential to generate the ion wind 18 from the electrode 5 in the direction normal to the surface of the water absorbing humidification member 4. The air 7 is caused to flow through the air passage while causing the ion wind 18 to impinge on the surface of the water absorbing humidification member 4, with the result that the saturated air layer 16a in the vicinity of the surface of the water absorbing humidification member 4 may be diffused, and the saturated air layer thickness δ 16 may be reduced. Therefore, based on the equation (1), evaporation of the humidification water 1 from the water absorbing humidification member 4 may be facilitated significantly.

Moreover, as shown in FIG. 8, the discharge power may be controlled to control an intensity of the ion wind 18 toward the direction normal to the surface of the water absorbing humidification member 4, and hence to change the humidification performance, with the result that the humidification performance may be controlled over a wide range. Moreover, when contaminants such as organic substances adhere to the water absorbing humidification member 4, the water absorbing humidification member 4 is reduced in hydrophilicity and hence in water absorption capacity. However, in Embodiment 1, high activity species are generated in the space between the water absorbing humidification member 4 and the electrode 5 along with the generation of the ion wind 18, and the high activity species are moved in the direction of the surface of the water absorbing humidification member 4 by the ion wind 18, with the result that the contaminants adhering to the water absorbing humidification member 4 may be discomposed and removed to maintain the hydrophilicity.

Embodiment 2

A humidifier 12 according to Embodiment 2 of the present invention and an air-conditioning apparatus 15 including the humidifier 12 are described focusing on a difference from Embodiment 1.

Figure 14:
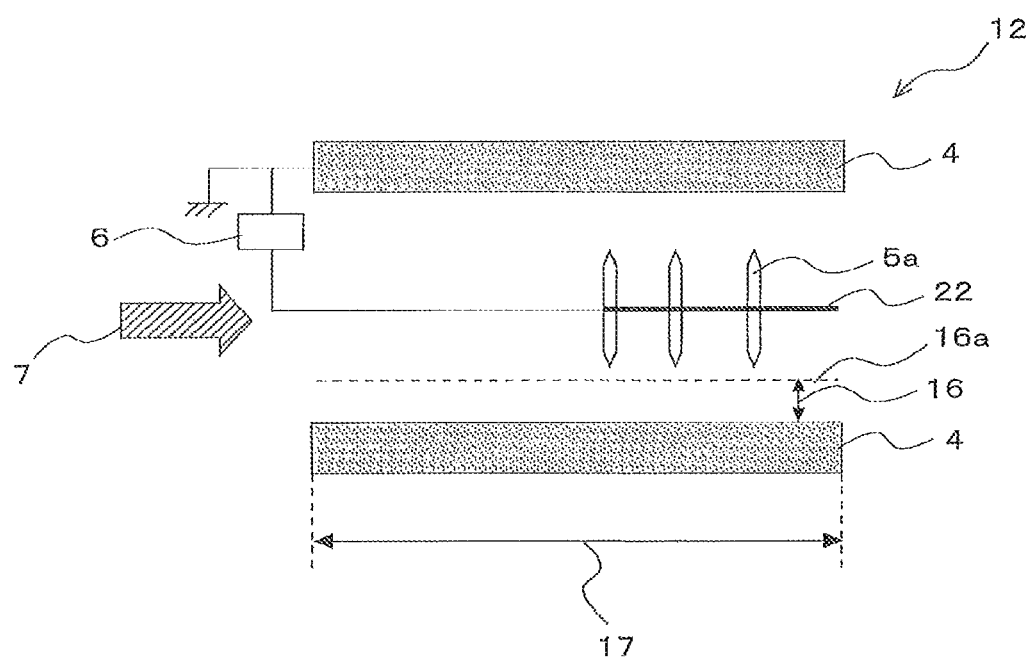
FIG. 14 is a structural view of a humidifier according to Embodiment 2 of the present invention.

FIG. 14 is a structural view of the humidifier 12 according to Embodiment 2 of the present invention.

In FIG. 14, a structure including an electrode 22 opposed only to a surface in a downstream portion of the water absorbing humidification member 4 on the downstream side of the air passage for the air 7 is illustrated, and the other components are the same as in FIG. 1.

When a humidification operation is performed by supplying the humidification water 1 to the water absorbing humidification member 4 having the same potential as the ground potential, the air 7 on the upstream side of the water absorbing humidification member 4 is first humidified, and hence based on the equation (2), as the water absorbing humidification member depth 17 L of the water absorbing humidification member 4 becomes longer, the saturated air layer thickness δ 16 becomes larger. Moreover, the water concentration $C_a$ of the air 7 is increased in accordance with a distance over which the air 7 flowing along the surface of the water absorbing humidification member 4 in parallel with the water absorbing humidification member 4 is caused to pass. Therefore, a water concentration difference, which is a difference between the water concentration $C_o$ in the water absorbing humidification member 4 and the water concentration $C_a$ in the air 7, is reduced, and hence based on the equation (1), the rate of diffusion $N_a$ is reduced, with the result that the humidification performance of the water absorbing humidification member 4 is reduced.

Therefore, the structure including the electrode 22 opposed only to the surface in the downstream portion of the water absorbing humidification member 4 is adopted so that the humidification is facilitated in the downstream portion of the water absorbing humidification member 4. Note that, in practical use, the supply unit 2, the water absorbing humidification member 4, the electrode 22, the power supply 6, and the blower 8 may be fixed by the predetermined support. The support is not particularly limited, and only needs to be selected as appropriate depending on the usage.

Note that, the operation is similar to that of Embodiment 1, and is therefore omitted herein.

Effects of Embodiment 2

The structure including the electrode 22 opposed to the surface in the downstream portion of the water absorbing humidification member 4 is adopted, with the result that, as compared to the electrode 5 opposed to the entire surface of the water absorbing humidification member 4 as in Embodiment 1, when an arrangement interval of the protruding portions 5a is the same, the number of protruding portions 5a of the electrode 22 becomes smaller. Therefore, the discharge power of each of the protruding portions 5a is increased, and the ion wind 18 having a higher air velocity may be generated from the protruding portion 5a to the direction normal to the surface of the water absorbing humidification member 4.

Then, the ion wind 18 is caused to impinge on the surface of the water absorbing humidification member 4 opposed to the electrode 22 from the normal direction, with the result that the saturated air layer 16a near the surface of the water absorbing humidification member 4 may be agitated, and the saturated air layer thickness δ 16 may be reduced by the increase in air velocity.

Therefore, the humidification may be facilitated in the downstream portion of the water absorbing humidification member 4, in which the humidification effect is lower, and hence the humidification performance may be improved. Moreover, the discharge power is controlled as shown in FIG. 8, with the result that the intensity of the ion wind 18 toward the direction normal to the surface of the water absorbing humidification member 4 may be controlled.

Embodiment 3

A humidifier 12 according to Embodiment 3 of the present invention and an air-conditioning apparatus 15 including the humidifier 12 are described focusing on a difference from Embodiment 1.

Figure 15:
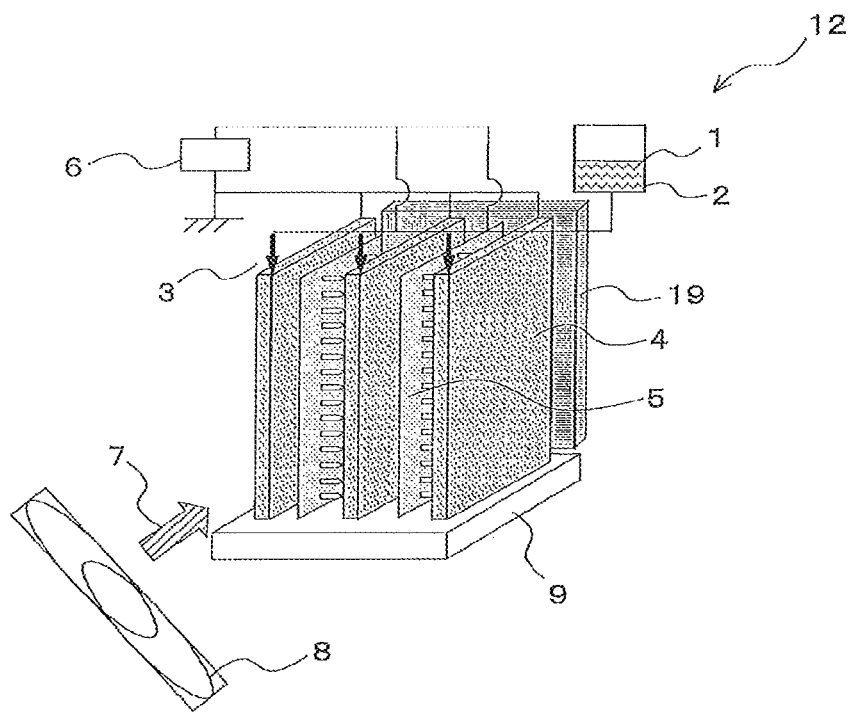
FIG. 15 is a structural view of a humidifier according to Embodiment 3 of the present invention.

FIG. 15 is a structural view of the humidifier 12 according to Embodiment 3 of the present invention.

In FIG. 15, a structure including an ozone decomposition mechanism 19 for decomposing ozone on the downstream side of the air passage between the water absorbing humidification member 4 and the electrode 5 is illustrated, and the other components are the same as those of FIG. 1.

In the case where the humidification performance is controlled by causing the corona discharge between the water absorbing humidification member 4 and the electrode 5 to generate the ion wind 18, ozone is generated as a discharge byproduct. Ozone has a very high activity and contributes to decomposition and inactivation of toxic substances, germs, viruses, and the like, while at the same time being highly corrosive, which leads to concern about a load on a human body, and an emission concentration of 0.1 ppm is specified as an allowable concentration in indoor environment standards and working environment. Therefore, in Embodiment 3, the structure including the ozone decomposition mechanism 19 on the downstream side of the air passage between the water absorbing humidification member 4 and the electrode 5, which generate the ion wind 18, is adopted.

The ozone decomposition mechanism 19 may be any mechanism as long as ozone generated by the corona discharge between the water absorbing humidification member 4 and the electrode 5 is decomposed, and includes a UV method in which ozone is decomposed with UV rays having a wavelength of 254 nm, a thermal decomposition method in which ozone is thermally decomposed with high-temperature gas, an activated carbon method in which ozone is adsorbed on active carbon for decomposition, a catalytic method in which ozone is catalytically cracked with a catalyst such as manganese dioxide, and the like, one of which only needs to be determined depending on removal performance, the usage, the pressure loss, and an environment of application. In a case of application to the humidifier 12 according to the present invention, the catalytic method using a honeycomb catalyst, which is easy to install and capable of reducing the pressure loss, is preferred.

(Operation of Humidifier)

Next, the humidifier 12 according to Embodiment 3 and the air-conditioning apparatus 15 including the humidifier 12 are described with reference to FIG. 15.

In the case where the corona discharge is caused between the water absorbing humidification member 4 and the electrode 5, and the ion wind 18 is caused to impinge on the surface of the water absorbing humidification member 4 in the normal direction for humidification, the humidification performance is controlled through control of the voltage applied to the electrode 5 by the power supply 6. At this time, the control on the power supply 6 may generate ozone of a predetermined value or more, and hence humidification control is performed by providing the ozone decomposition mechanism 19 on the downstream side of the air passage between the water absorbing humidification member 4 and the electrode 5 to reduce the concentration of ozone emitted from the humidifier 12 to the predetermined value or less. Note that, in practical use, the supply unit 2, the water absorbing humidification member 4, the electrode 5, the power supply 6, the blower 8, and the ozone decomposition mechanism 19 may be fixed by the predetermined support. The support is not particularly limited, and only needs to be selected as appropriate depending on the usage.

Effects of Embodiment 3

With the ozone decomposition mechanism 19, the humidifier 12 capable of decomposing and removing ozone accompanying the generation of the ion wind 18, suppressing corrosion of equipment due to the suppression of ozone emitted from the humidifier 12, and controlling the humidification performance, and the air-conditioning apparatus 15 including the humidifier 12 may be provided.

Embodiment 4

A humidifier 12 according to Embodiment 4 of the present invention and an air-conditioning apparatus 15 including the humidifier 12 are described focusing on a difference from Embodiment 1.

In the case of the humidifier 12 using a normal water absorbing humidification member 4, after the humidification operation by a user, in order to suppress generation of mold on the water absorbing humidification member 4, an air-sending operation in which the supply of the humidification water 1 is stopped is performed on the water absorbing humidification member 4 for a predetermined period of time so that the generation of mold is suppressed by drying the water absorbing humidification member 4. However, the humidifier 12 and the air-conditioning apparatus 15 including the humidifier 12 may be used for a computer room, for example, and need to continuously perform the humidification operation. In this case, the water absorbing humidification member 4 is continuously supplied with the humidification water 1, and an environment in which mold is likely to grow is created, which leads to a hygienic problem.

(Operation of Humidifier)

Figure 16:
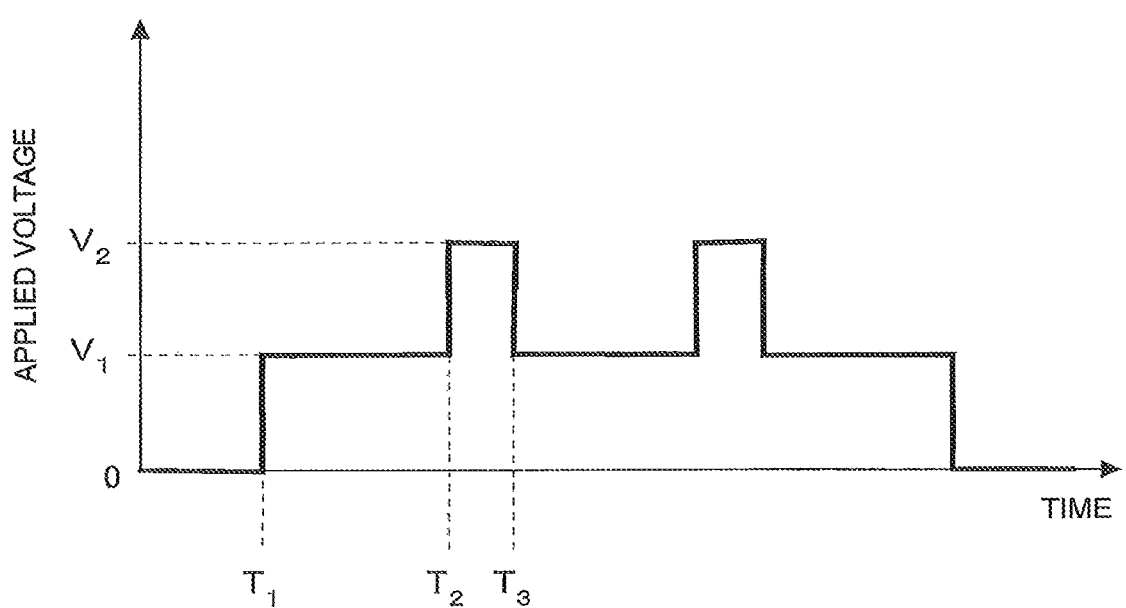
FIG. 16 is an operation chart of a humidifier according to Embodiment 4 of the present invention.

FIG. 16 is an operation chart of the humidifier 12 according to Embodiment 4 of the present invention. In FIG. 16, the vertical axis represents the voltage applied to the electrode 5, and the horizontal axis represents time.

Next, operations of the humidifier 12 according to Embodiment 4 and the air-conditioning apparatus 15 including the humidifier 12 are described with reference to FIG. 16.

The humidification is performed by causing the ion wind 18 generated by the water absorbing humidification member 4 and the electrode 5 to impinge on the surface of the water absorbing humidification member 4 in the normal direction, but mold is generated on the water absorbing humidification member 4 with years of use.

Therefore, after the humidification operation by causing the air to flow until a time $T_1$, a voltage $V_1$ is applied to the electrode 5 to perform the humidification operation with the ion wind 18. After time has elapsed until a time $T_2$, the voltage applied to the water absorbing humidification member 4 and the electrode 5 is increased to a voltage $V_2$, and the water absorbing humidification member 4 is exposed to the high activity species such as ozone in a sterilization mode, in which the high activity species are generated. Then, after time has elapsed until a time $T_3$, a voltage value is reduced back to $V_1$ to perform the humidification operation with the ion wind 18 again. Those are repeated at a given cycle. Note that, times $T_1$, $T_2$, and $T_3$ only need to be determined as appropriate depending on a usage environment. Moreover, the voltages $V_1$ and $V_2$ only need to be determined depending on required humidification performance and a required ozone concentration.

Effects of Embodiment 4

The power supply 6 is controlled to control the voltage applied to the water absorbing humidification member 4 and the electrode 5, and the humidification operation with the ion wind 18 and the sterilization mode, in which the high activity species such as ozone are generated, are repeated at the given cycle, with the result that growth of fungi, which cause generation of mold, may be suppressed for the humidifier 12 in which the humidification water 1 is continuously supplied to the water absorbing humidification member 4, and the air-conditioning apparatus 15 constructing the humidifier 12. Therefore, the humidifier 12 capable of maintaining high hygiene, and the air-conditioning apparatus 15 constructing the humidifier 12 may be provided.

Embodiment 5

A humidifier 12 according to Embodiment 5 of the present invention and an air-conditioning apparatus 15 including the humidifier 12 are described focusing on a difference from Embodiment 1.

Figure 17:
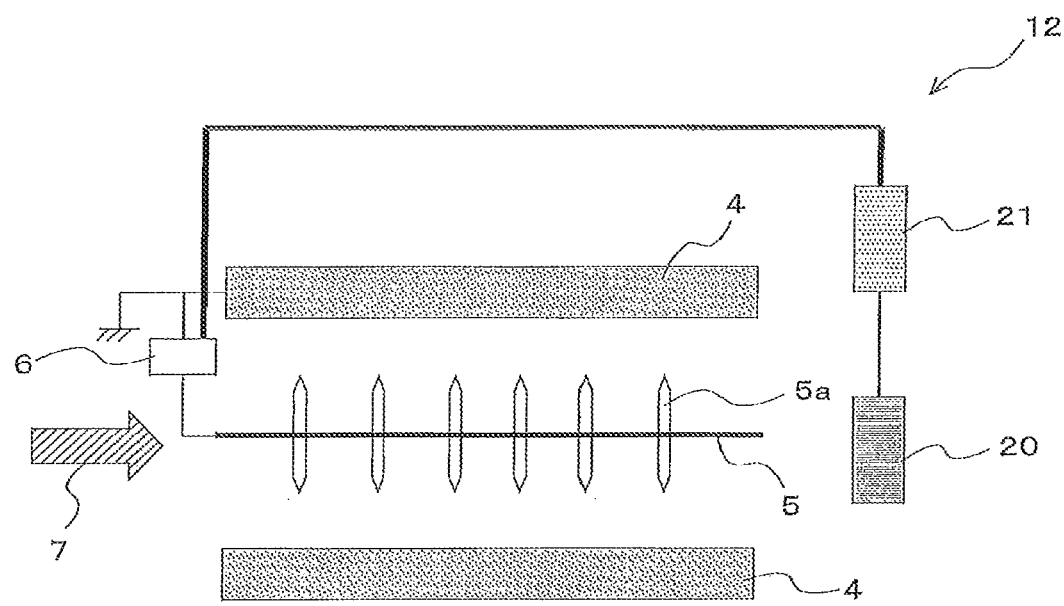
FIG. 17 is a structural view of a humidifier according to Embodiment 5 of the present invention.

FIG. 17 is a structural view of the humidifier 12 according to Embodiment 5 of the present invention.

FIG. 17 is similar to Embodiment 1 except that a temperature and humidity sensor 20 and an absolute humidity control unit 21 are provided.

The humidifier 12 according to the present invention and the air-conditioning apparatus 15 including the humidifier 12 are configured to perform humidification by causing the ion wind 18 generated by the water absorbing humidification member 4 and the electrode 5 to impinge on the surface of the water absorbing humidification member 4. However, excessive humidification lowers indoor temperature with evaporation heat, and hence a heating load in winter is increased. Therefore, in Embodiment 5, the temperature and humidity sensor 20 and the absolute humidity control unit 21 for analyzing a signal of the temperature and humidity sensor 20 are provided on the downstream side of the air passage between the water absorbing humidification member 4 and the electrode 5.

It is desired that the temperature and humidity sensor 20 be capable of detecting both the indoor temperature and humidity, but each of a temperature sensor and a humidity sensor may be used and connected to the absolute humidity control unit 21. The absolute humidity control unit 21 is configured to calculate an absolute humidity based on the signal from the temperature and humidity sensor 20, and control the voltage applied by the power supply 6 based on a value of the absolute humidity.

(Operation of Humidifier)

Next, operations of the humidifier 12 according to Embodiment 5 and the air-conditioning apparatus 15 including the humidifier 12 are described with reference to FIG. 17.

The humidification is performed by causing the ion wind 18 generated by the water absorbing humidification member 4 and the electrode 5 to impinge on the water absorbing humidification member 4. At this time, a temperature and a humidity of the air 7 are measured by the temperature and humidity sensor 20 provided on the downstream side of the air passage between the water absorbing humidification member 4 and the electrode 5. Based on results of the measurements, the absolute humidity in an indoor environment is detected, and the power supply 6 is controlled with the signal of the absolute humidity control unit 21 depending on the detected value. The electrode 5 is controlled with the voltage applied by the power supply 6, with the result that the ion wind 18 having the determined air velocity is caused to flow along the surface of the water absorbing humidification member 4. Note that, in practical use, the supply unit 2, the water absorbing humidification member 4, the electrode 5, the power supply 6, the blower 8, the temperature and humidity sensor 20, and the absolute humidity control unit 21 may be fixed by the predetermined support. The support is not particularly limited, and only needs to be selected as appropriate depending on the usage.

Effects of Embodiment 5

With the above-mentioned structure, in the humidifier 12 in which the humidification is performed by generating the ion wind 18 between the water absorbing humidification member 4 and the electrode 5, the humidification performance is controlled by the temperature and humidity sensor 20, with the result that the humidification may be performed without increasing the heating load.

Embodiment 6

A humidifier 12 according to Embodiment 6 of the present invention and an air-conditioning apparatus 15 including the humidifier 12 are described focusing on a difference from Embodiment 1.

Figure 18:
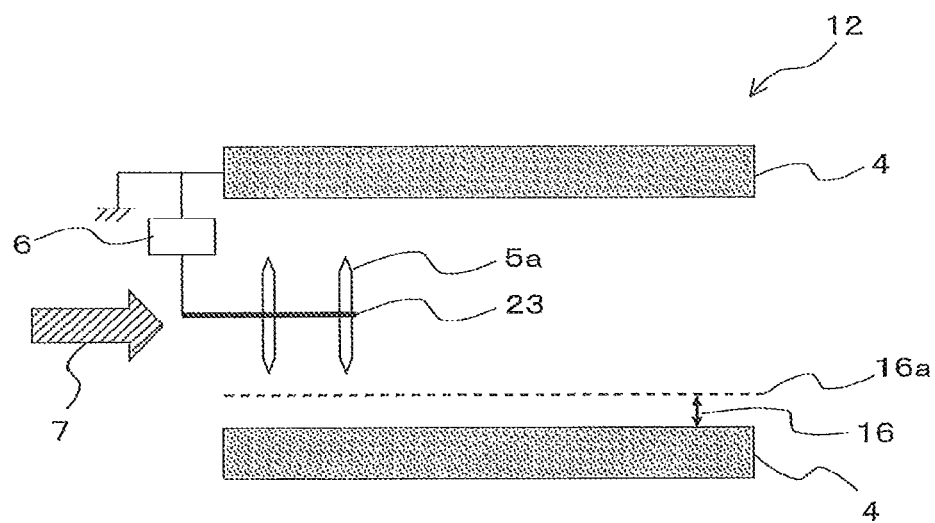
FIG. 18 is a structural view of a humidifier according to Embodiment 6 of the present invention.

FIG. 18 is a structural view of the humidifier 12 according to Embodiment 6 of the present invention.

In FIG. 18, a structure including an electrode 23 opposed only to a surface in an upstream portion of the water absorbing humidification member 4 on the upstream side of the air passage for the air 7 is illustrated, and the other components are the same as in FIG. 1.

On the upstream side of the water absorbing humidification member 4 into which low-humidity air flows, the water concentration difference, which is the difference between the water concentration $C_o$ in the water absorbing humidification member 4 and the water concentration $C_a$ in the air 7, is increased, and based on the equation (1), the rate of diffusion $N_a$ is increased to facilitate the humidification. Further, in supplying the humidification water 1 to the water absorbing humidification member 4 having the same potential as the ground potential to perform the humidification operation, the ion wind 18 flowing from the distal end of the protruding portion 5a of the electrode 5 to the direction normal to the surface of the water absorbing humidification member 4 acts to decrease the saturated air layer thickness δ 16, which facilitates the humidification.

Therefore, the structure including the electrode 23 opposed only to the surface in the upstream portion of the water absorbing humidification member 4 is adopted so that the humidification is facilitated in the upstream portion of the water absorbing humidification member 4.

Note that, in practical use, the supply unit 2, the water absorbing humidification member 4, the electrode 23, the power supply 6, and the blower 8 may be fixed by the predetermined support. The support is not particularly limited, and only needs to be selected as appropriate depending on the usage.

Further, the operation is similar to that of Embodiment 1, and is therefore omitted herein.

Effects of Embodiment 6

The structure including the electrode 23 opposed to the surface in the upstream portion of the water absorbing humidification member 4 is adopted, with the result that, as compared to the electrode 5 opposed to the entire surface of the water absorbing humidification member 4 as in Embodiment 1, when an arrangement interval of the protruding portions 5a is the same, the number of protruding portions 5a of the electrode 23 becomes smaller. Therefore, the discharge power of each of the protruding portions 5a is increased, and the ion wind 18 having a higher air velocity may be generated from the protruding portion 5a to the direction normal to the surface of the water absorbing humidification member 4.

Then, the ion wind 18 is caused to impinge on the surface of the water absorbing humidification member 4 opposed to the electrode 23 from the normal direction, with the result that the saturated air layer 16a near the surface of the water absorbing humidification member 4 may be agitated, and the saturated air layer thickness δ 16 may be reduced by the increase in air velocity.

Therefore, the humidification may be further facilitated in the upstream portion of the water absorbing humidification member 4, into which low-humidity air flows, and hence the humidification performance may be improved. Moreover, the discharge power is controlled as shown in FIG. 8, with the result that the intensity of the ion wind 18 toward the direction normal to the surface of the water absorbing humidification member 4 may be controlled.

Embodiment 7

A humidifier 12 according to Embodiment 7 of the present invention and an air-conditioning apparatus 15 including the humidifier 12 are described focusing on a difference from Embodiment 1.

In the structure of Embodiment 1, the water absorbing humidification member 4 is conductive, and hence the ion wind 18 flowing from the distal end of the protruding portion 5a of the electrode 5 to the direction normal to the surface of the water absorbing humidification member 4 acts. However, in a case where the water absorbing humidification member 4 is non-conductive, the ion wind 18 is not generated, and hence the humidification effect using the ion wind 18 is not obtained.

Figure 19:
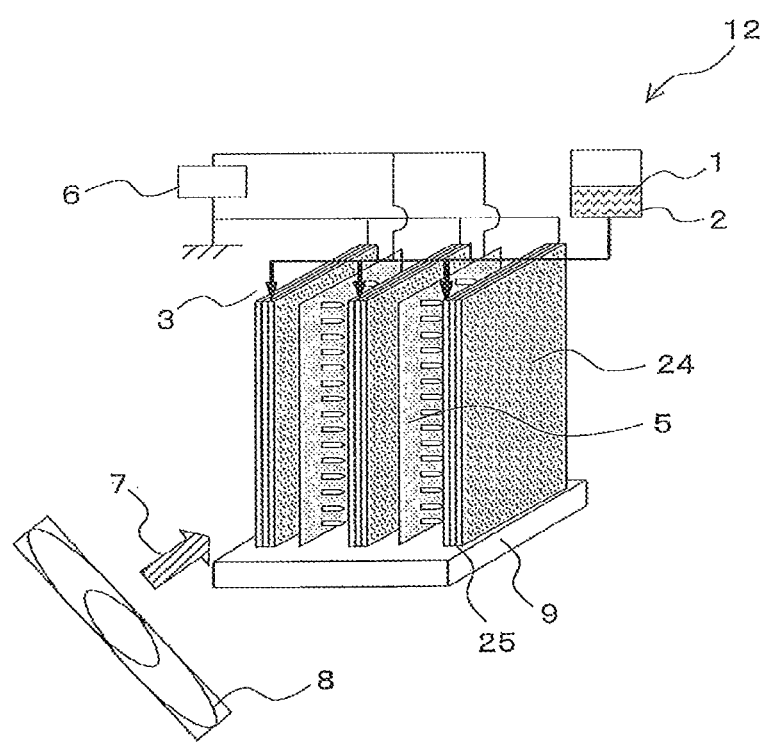
FIG. 19 is a structural view of a humidifier according to Embodiment 7 of the present invention.

In Embodiment 7, a structure in which a conductor 25 such as a metal plate or metal mesh is interposed between non-conductive water absorbing humidification members 24 as illustrated in FIG. 19 is adopted.

In this manner, the humidification effect using the ion wind 18 may be obtained even when the non-conductive water absorbing humidification members 24 are used. Note that, the conductor 25 only needs to be provided between the distal end of the protruding portion 5a of the electrode 5 and the water absorbing humidification members 24, and may or may not be in contact with the water absorbing humidification members 24.

Moreover, the water absorbing humidification member 24 may be provided on a side opposed to the conductor 25 with respect to the distal end of the protruding portion 5a of the electrode 5. In a case where the ion wind 18 is generated between the distal end of the protruding portion 5a of the electrode 5 and the conductor 25, and the conductor 25 is a metal having openings, such as metal mesh or a punching metal, a structure in which the ion wind 18 passes through opening portions of the conductor 25 and impinges on the water absorbing humidification member 24 at the opposing surface is obtained, with the result that the humidification may be facilitated.

Effects of Embodiment 7

The conductor 25 is provided between the water absorbing humidification members 24, or the water absorbing humidification member 24 is provided on the side opposed to the conductor 25 with respect to the distal end of the protruding portion 5a of the electrode 5, with the result that the humidification effect using the ion wind 18 may be obtained even when the water absorbing humidification member 24 is non-conductive. Therefore, the input to the electrode 5 may be controlled to control the humidification performance.

REFERENCE SIGNS LIST

1 humidification water 2 supply unit 3 nozzle 4 water absorbing humidification member 5 electrode 5a protruding portion 5b wire 6 power supply 7 air 8 blower 9 drain pan 10 pore 11 body 12 humidifier 13 filter 14 heat exchanger 15 air-conditioning apparatus 16 saturated air layer thickness δ 16a saturated air layer 17 depth L 18 ion wind 19 ozone decomposition mechanism 20 temperature and humidity sensor 21 absolute humidity control unit 22 electrode 23 electrode 24 water absorbing humidification member 25 conductor 101 positive DC voltage 102 negative DC voltage 103 AC voltage

The invention claimed is:

1. A humidifier comprising:
an electrode being conductive;
water absorbing humidification bodies positioned to sandwich the electrode and having respective surfaces opposing each other with the electrode between the respective surfaces;
a power supply to apply a voltage to the electrode;
a water supply unit to supply humidification water to the water absorbing humidification bodies; and
a blower to cause air to flow in a space between the water absorbing humidification bodies sandwiching the electrode,
wherein the electrode provided with the voltage by the power supply includes protruding portions extending perpendicularly from opposite sides of the electrode each in a first direction toward the water absorbing humidification bodies and having a shape of one of a triangular shape, a needle shape, or a sawtooth shape and that are configured to generate ion wind flowing in a different direction to the flow of air,
wherein the blower is positioned to blow the air to flow in a second direction perpendicular to the first direction that the protruding portions extend.

2. The humidifier of claim 1, wherein at least one of the water absorbing humidification bodies is electrically grounded.

3. The humidifier of claim 1, wherein at least one of the water absorbing humidification bodies is porous.

4. The humidifier of claim 1,
wherein the protruding portions are electrically conductive.

5. The humidifier of claim 1, wherein the electrode comprises an electrically conductive wire.

6. The humidifier of claim 1, wherein humidification performance is controlled by controlling discharge power, the discharge power having a value expressed as a product of a value of the voltage applied to the electrode and a current discharged from the electrode to the water absorbing humidification bodies.

7. The humidifier of claim 1, wherein the power supply applies a positive DC voltage to the electrode.

8. The humidifier of claim 7, further comprising a superimposing unit to superimpose a pulse voltage on a positive DC voltage, the positive DC voltage being applied to the electrode by the power source.

9. The humidifier of claim 1, further comprising an ozone decomposition mechanism to decompose ozone, the ozone decomposition mechanism being provided on a downstream side of an air passage between the water absorbing humidification bodies.

10. The humidifier of claim 1, wherein a value of the voltage applied to the electrode is controlled by the power supply such that a humidification operation using the ion wind and a sterilization mode in which high activity species of at least ozone are generated are repeated at a given cycle.

11. The humidifier of claim 1, further comprising a temperature and humidity sensor and an absolute humidity control unit, which are provided on a downstream side of an air passage between the water absorbing humidification bodies,
wherein, based on a result of measuring a temperature and a humidity of the air by the temperature and humidity sensor, an absolute humidity in an indoor environment is detected, and the power supply is controlled with a signal of the absolute humidity control unit depending on a value of the detected absolute humidity.

12. The humidifier of claim 1, further comprising:
a conductor provided between the electrode and one of the water absorbing humidification bodies.

13. An air-conditioning apparatus, comprising the humidifier of claim 1.

14. The humidifier of claim 1, further comprising a controller configured to increase or decrease an amount of voltage applied to the electrode.

15. A humidifier comprising:
a conductive electrode;
conductive mesh bodies positioned to sandwich the electrode and having respective surfaces opposing each other with the electrode between the respective surfaces;

a power supply to apply a voltage to the electrode;
a nozzle to supply humidification water to the conductive mesh bodies; and
a blower to cause air to flow in a space between the conductive mesh bodies,
wherein the electrode provided with the voltage by the power supply includes protruding portions extending perpendicularly from opposite sides of the electrode each in a first direction toward the conductive mesh bodies and having a shape of one of a triangular shape, a needle shape, or a sawtooth shape and that are configured to generate ion wind flowing in a different direction to the flow of air,
wherein the blower is positioned to blow the air to flow in a second direction perpendicular to the first direction that the protruding portions extend.

* * * * *